Patented July 11, 1939

2,165,722

UNITED STATES PATENT OFFICE 2,165,722

PROCESS FOR TREATING BLOOD

James L. Norman, Oakland, Calif.

No Drawing. Application January 26, 1938,
Serial No. 187,005

5 Claims. (Cl. 99—21)

This invention relates to a blood product and process and has for its objects a blood product adapted to be used as a substitute for meat and process for producing the same, which product is free from objectionable odors and is of pleasing color, and is suitable for human consumption, and is in particles of uniform size and consistency. A further object is a product of the above character in which the food values therein are substantially unimpaired and also a process of producing such product economically and without contamination. Other objects and advantages will appear in the following description and claims.

Briefly described, heretofore beef blood and the like has been recovered and processed principally for use of the same as a fertilizer. After killing, the animals are generally hung in a row and the blood drained from the bodies through a cut at the throat of each animal. This blood from the various animals is carried away by a common drain to tanks where coagulation and cooking is effected by introduction of steam into the tanks through the blood, resulting in a mass of congealed, cooked blood of about the texture of loose loam soil with larger lumps therein where coagulation has been irregular. The odor of the resultant product is very objectionable, and, of course, said product is wholly unsuitable for human consumption or as a dog or animal food, both because of the objectionable odor and because of its contamination with the hair and skin of the animals during draining from the bodies, and because of contamination during subsequent handling and the mixing of the blood of healthy and diseased animals. Furthermore, the heretofore practiced method of congealing and cooking results in non-uniformity of the finished product, the smaller particles being highly cooked, and the larger ones being partially cooked. This lack of uniformity in size and degree of cooking is obviously accompanied with a lack of uniformity in texture and digestibility in the finished product.

The product of my process is free from objectionable odor and meets with every requirement for use as a food product, and is absolutely uniform in texture, color, and in food values.

In practicing my process, the killed animals are each hung from the hooks or racks and a slit is made in the skin of the throat through which slit a tube is inserted with its open end within the neck adjacent the principal artery, and the blood is drained through said tube into a clean receptacle, one for each body. The receptacles are then given an identification, such as a number, which is the same as that given to the body from which the blood was drawn, and after inspection of the body for disease, the receptacles containing the blood from the healthy animals may be emptied into a common receptacle where the blood is congealed, preferably by refrigeration, until the blood is about the consistency of liver, when the blood water which separates from the coagulated blood is removed. The congealed blood does not stick to the sides of the container when so congealed, as in the case where blood is congealed by heat or the introduction of steam into the mass.

After the blood is congealed, by allowing to stand at atmospheric temperature, or preferably under refrigeration, the congealed blood may be diced or comminuted into small pieces, about $\frac{1}{8}$ to $\frac{1}{2}$ inch in diameter, preferably about $\frac{1}{4}$ inch, for convenience, thus reducing the congealed mass into uniform sized pieces without the sluffing off of the more or less liquid content of the cubes or particles, as is in the case where the blood is finely ground or is broken up by steam during the congealing step.

The blood cubes or pieces, as above described are then dropped into ordinary hard water or natural, such as contains sodium or calcium in the form generally present in water, which water is at a temperature of about 212° F., or slightly higher if there is an excess of sodium or calcium in the water, and the pieces remain in such water for not less than about 1½ minutes up to 3 minutes, the latter being preferable, at which time the particles are of about the consistency of relatively soft rubber and are free from objectionable odors and are of a pleasing, reddish-brown color. The manner of subjecting the congealed pieces of blood to the effect of the hot water may be by use of a wire basket filled with said pieces and then placed in the water or the pieces may be placed in the water in any desired quantity and then lifted out or the water drained off or the water may be poured over the pieces. The method of using the wire basket is found preferable.

After the pieces of blood are cooked in the water, as above described, the cooked blood is suitable for use as a food or may be canned in the usual manner with or without other food products, which canning includes the application of heat preferably from 212° to say about 250° F. to effectively kill any undesirable micro-organisms that may be in the product.

In the cooking of the cut pieces, the longer the blood is left in the water, the more completely it is cooked, but the odor will be practically eliminated from the same at from about 1½ to about 5 minutes for dices of say, about ¼ inch sides, but where smaller pieces of say about ⅛ inch sides or less are formed, the time of cooking in water can be materially reduced to almost merely the immersion of the particles and immediate removal from the water. Also a temperature of water at 200° F. can be used, provided the pieces remain therein a sufficient time, say about 10 minutes for dices having about ¼ inch sides, but less than 200° F. appear to be impractical. The desired point of time is that which will solidify the particles, meaning that no liquid remains in the particles in a state where it will come to the surface after cooking, but excess cooking beyond the point of stabilization of the product is not desirable since food values are lost together with excess shrinkage. With my product as described above in the preferred form, is contained about 25% crude protein by weight.

I claim:

1. The process of preparing fresh animal blood for consumption thereof comprising the steps of placing the fresh blood from the slaughtered animal in a receptacle, coagulating the fresh blood without increase in the temperature thereof, thereafter cutting the coagulated blood into pieces of substantially uniform-sized pieces and placing the cut pieces into natural water having a temperature of substantially 212° F. for a period of at least about 1½ to 3 minutes, and thereafter removing said pieces from the water.

2. The process of preparing fresh animal blood for consumption thereof comprising the steps of allowing the fresh blood from the slaughtered animal to stand in a quiescent state until coagulated, then draining the blood water from the mass of coagulated blood, then cutting the coagulated blood into relatively small uniformly sized pieces, then placing the cut pieces into relatively hard water of boiling temperature until the temperature of the pieces is substantially that of the water, and thereafter removing said pieces from the water.

3. The process of preparing fresh animal blood for consumption thereof that comprises the steps of draining the warm fresh blood from within a slaughtered animal into a receptacle without contact of the blood with the skin or hair of the animal, then coagulating the blood in said receptacle at less than the normal temperature of the fresh blood, then reducing the mass of coagulated blood to relatively small, substantially uniformly sized pieces, and then placing said pieces into substantially boiling water containing sodium or calcium for from about 1½ to about 3 minutes, and thereafter removing the pieces from the boiling water.

4. In the process of treating blood for consumption thereof as an animal food comprising the step of immersing coagulated fresh beef blood in boiling hard water for about 3 minutes' time and thereafter removing the blood from the water and hermetically sealing the same in cans and subjecting the canned blood to a temperature above 212° F. for a predetermined period of time until the sealed blood is raised to said predetermined temperature.

5. In the process of treating blood for consumption thereof as an animal food comprising the steps of coagulating the fresh blood from a slaughtered animal by refrigeration, thereafter reducing the coagulated blood to relatively small pieces, and then immersing said pieces in natural water of substantially boiling temperature.

JAMES L. NORMAN.